Patented Dec. 28, 1948

2,457,634

UNITED STATES PATENT OFFICE 2,457,634

BREAKING EMULSIONS

Donald C. Bond, Northbrook, and Michael Savoy, Chicago, Ill., assignors to The Pure Oil Company, Chicago, Ill., a corporation of Ohio No Drawing. Application October 8, 1945, Serial No. 621,176

5 Claims. (Cl. 252—338)

This invention relates to demulsifying agents, their preparation and use.

An object of the invention is to provide a new demulsifying agent for demulsifying mineral oil-water emulsions.

Another object of the invention is to provide a method for preparing a new demulsifying agent capable of breaking water-in-oil emulsions.

A further object of the invention is to provide a method for demulsifying mineral oil-water emulsions.

Other objects of the invention will become apparent from the following description.

We have discovered that water-oil emulsions such as emulsions of brine in crude mineral oil can be broken by mixing with the emulsion a small amount of a soap-like material prepared by reacting a mineral acid with the non-resinous complex amine formed by reacting a phenol with an aldehyde and a non-aromatic secondary amine.

The phenols used in preparing the demulsifying agent, in accordance with our invention, must contain at least one reactive nuclear position, either ortho or para to a phenolic hydroxyl group and must be free of aldehyde groups and acidic groups, such as sulfonic and carboxyl groups, since such groups inhibit proper condensation. As examples of phenols which are useful in preparing our novel demulsifying agent may be mentioned p-tertiary-butyl phenol, butyl-resorcinol, butylnaphthol and their respective higher homologues such as amyl, hexyl, heptyl and octyl homologues and alkyl substituted cresols, alkyl substituted hydroquinones and alkyl substituted resorcinols having alkyl groups corresponding to the aforementioned groups.

The aldehyde which is used in preparing our novel demulsifier may be aromatic, heterocyclic and saturated or unsaturated aliphatic. As examples of aldehyde which are useful may be mentioned formaldehyde, acetaldehyde, cinnamic aldehyde, benzaldehyde, crotonaldehyde and furfural.

The secondary amine which is used in preparing our novel composition should be non-aromatic and the alkyl groups may be substituted or unsubstituted. Amines should be free of acidic groups such as sulfonic and carboxyl groups and also from aldehyde groups. As examples of secondary amines which are useful in preparing our novel product may be mentioned dimethylamine, methylethylamine, diethylamine, dipropylamine, dibutylamine, dioctylamine, and hydroxy substituted amines such as diethanolamine.

As acids which may be used may be mentioned hydrochloric, hydrofluoric, sulfuric and phosphoric.

Our novel demulsifying agent is preferably made in the following manner: one mole of phenol is mixed with one mole of the secondary amine and with one mole of the aldehyde in the presence of sufficient water to dissolve the several compounds and the mixture agitated at temperatures, preferably but not necessarily, below 20° C. If desired, the reaction may be speeded by heating the mixture under reflux conditions. The formaldehyde is preferably added slowly to the phenol and secondary amine during the stirring and while the temperature is maintained at the desired level. After the aldehyde is all added, the mixture is allowed to stand at atmospheric temperature for a period of time sufficient to permit the formation of a viscous oily product, after which it is distilled, preferably under vacuum, to remove water. A pale, viscous oil is obtained which is mixed with a concentrated mineral acid and then again evaporated to remove water and excess acid. The resulting product is the desired demulsifying agent.

As a specific example, one mole of p-tertiary-butyl phenol was mixed with 100 cc. of water and one mole of diethanolamine. The mixture was cooled to 0° C. and one mole of formaldehyde in the form of a 30% aqueous solution was added slowly while stirring and cooling. The mixture was allowed to stand at room temperature for twenty-four hours after which the water was distilled off under vacuum. Ten grams of the pale viscous oil obtained was mixed with 10 cc. of concentrated hydrochloric acid at atmospheric temperature, the water was evaporated off on a hot plate and a soap-like residue was obtained.

As a second example, one mole of formaldehyde in the form of a 37% aqueous solution was slowly added to one mole of p-tertiary butyl phenol in 100 cc. of water containing also one mole of diethanolamine. The mixture was maintained at 10° C. during the addition of the formaldehyde and thereafter allowed to stand at room temperature for twenty-four hours after which the water was removed by vacuum distillation over a hot water bath. A pale, yellow viscous oil was obtained to ten grams of which 30 cc. of 6 normal hydrochloric acid was added at room temperature and the excess water and acid evaporated on a steam bath, leaving a soap-like residue as the desired demulsifying agent.

One part of the product obtained in accordance with Example I was added to one-thousand parts of a crude oil emulsion heated to 140° F., obtained from a sand-stone formation in the Noble Field, Illinois. 93.9% of the water content of the emulsion separated. Another sample of the emulsion was treated under the same conditions with a well-known commercial demulsifying agent in current use for demulsifying this particular emulsion. Only 84% of the water separated out.

The same treatment was used on a crude oil emulsion from a lime-stone formation in Noble Field, Illinois and 75% of the water separated out in ninety minutes as against only 30% of the water separating out under the same conditions and in the same period of time when using the aforesaid well-known commercial demulsifying agent.

The product prepared in accordance with Example II was tested on a sand-stone crude oil emulsion from the Noble Field, Illinois and on an emulsion from bromide sand formation in the Cumberland, Oklahoma field. The results obtained on this test and in comparable tests using other demulsifying agents are given in the following table. In these tests one gram of demulsifying agent was added to 1000 cc. of emulsion heated to a temperature of 140° F.

In the table the demulsifying agent designated as numeral 1 is the product formed in accordance with the second example. The demulsifying agent designated by the numeral 2 is a demulsifying agent which was prepared precisely as set forth in the second example, except that instead of using 6 normal hydrochloric acid to react with the pale yellow viscous oil obtained, diamyl naphthalene sulfonate was reacted with the oil. The demulsifying agent designated by the numeral 3 is the same well-known commercial product against which the product made in accordance with Example I was tested; and the demulsifying agent designated by the numeral 4 was prepared precisely as set forth in the second example, except that p-toluene sulfonic acid was used instead of hydrochloric acid.

sion takes place much more rapidly if the emulsion is treated at temperatures of approximately 125°–150° F., particularly in the case of viscous emulsions.

It will be seen, therefore, that we have succeeded in preparing a novel demulsifying agent which has superior properties in breaking water-in-oil emulsions.

It is claimed:

1. The method of breaking water-in-oil emulsions comprising, mixing said emulsions with a small amount of an agent which is a non-resinous reaction product of a mineral acid and an oil formed by reacting at ambient temperature in the presence of a small amount of water substantially equimolar amounts of a secondary aliphatic amine free from acidic groups, an alkylated phenol free from acidic groups, and selected from the group consisting of those having an active position ortho to a nuclear hydroxy group and those having an active position para to a nuclear hydroxy group, and an aldehyde.

2. The method of breaking water-in-oil emulsions comprising, mixing said emulsions with a small amount of an agent which is a non-resinous reaction product formed by reacting hydrochloric acid with the viscous oily condensation product formed by reacting p-tertiary butyl phenol and diethanolamine at about ambient temperature in substantially equimolar amounts, cooling the mixture to about 0° C., and reacting it with aqueous formaldehyde and then removing the water before reacting the non-resinous materials with hydrochloric acid.

3. The method of breaking water-in-oil emulsions comprising, mixing said emulsions with a small amount of an agent which is a non-resinous reaction product of hydrochloric acid and a viscous oil, the oil being the product of the reaction induced at about ambient temperature and in the presence of a small amount of water between substantially equimolar amounts of a secondary aliphatic amine free of acidic groups, an alkylated phenol free from acidic groups selected from the group consisting of those having an Table

| Demulsifying Agent | Source of Oil-brine Emulsion | Percent Brine Separated | | | Percent B. S. & W. |
|---|---|---|---|---|---|
| | | In ½ Hr. | In 1 Hr. | In 2 Hrs. | |
| 1 | Bromide sand—Cumberland, Oklahoma | 60 | 98 | | 0.0 (1 hr.) |
| 2 | do | 12 | 72 | | 1.5 (1 hr.) |
| 3 | do | 62 | 64 | | 2.0 (1 hr.) |
| 1 | Sandstone—Noble, Illinois | 0 | 8 | 88 | 0.0 (2 hr.) |
| 4 | do | 0 | 0 | 0 | 6.0 (2 hr.) |
| 3 | do | 24 | 61 | 66 | 0.0 (2 hr.) |

It will be seen from the table that the product made in accordance with the second example was far superior to the product designated by the numeral 2 and although it did not cause quite as much separation of brine as the commercial product upon short periods of standing, it did separate out more brine when the mixture was permitted to stand for a longer period of time. It was also interesting to see that the product prepared in accordance with the second example did not cause separation of any B. S. & W.

Demulsifying agents prepared in accordance with our invention may be used in amounts of one part by weight to 250–30,000 parts by weight of the emulsion depending on the difficulty experienced in breaking the emulsion. Although the novel demulsifying agents are effective at atmospheric temperatures, breaking of the emulactive nuclear position ortho to a nuclear hydroxy group and those having an active position para to a nuclear hydroxy group, and an aldehyde.

4. The method of breaking water-in-oil emulsions comprising mixing said emulsions with a small amount of an agent prepared by forming a non-resinous reaction product with a mineral acid and a viscous oil, said oil being the product of the reaction induced at about ambient temperature and in the presence of a small amount of water between substantially equimolar amounts of a hydroxy substituted secondary aliphatic amine free of acidic groups, an alkyl substituted monohydroxy benzene free from acidic groups, and a saturated aliphatic aldehyde.

5. The method of breaking water-in-oil emulsions comprising, mixing said emulsions with a small amount of an agent which is a non-resinous reaction product of a mineral acid and a viscous oil, said oil being the product of the reaction induced at about ambient temperature and in the presence of a small amount of water between substantially equimolar amounts of diethanolamine, p-tertiary butyl phenol and formaldehyde.

DONALD C. BOND.
MICHAEL SAVOY.

REFERENCES CITED

The following references are of record in the file of this patent:

UNITED STATES PATENTS

| Number | Name | Date |
| --- | --- | --- |
| 1,912,330 | Wayne | May 30, 1933 |
| 1,919,871 | Wayne | July 25, 1933 |
| 1,937,259 | Wayne | Nov. 28, 1933 |
| 2,036,916 | Bruson | Apr. 7, 1936 |
| 2,040,039 | Bruson | May 5, 1936 |
| 2,040,040 | Bruson | May 5, 1936 |
| 2,110,837 | Blair | Mar. 8, 1938 |
| 2,360,323 | Herlocker et al. | Oct. 17, 1944 |
| 2,360,324 | Herlocker et al. | Oct. 17, 1944 |
| 2,363,134 | McCleary | Nov. 21, 1944 |